US012754168B2

(12) United States Patent
Leclerc

(10) Patent No.: US 12,754,168 B2
(45) Date of Patent: Oct. 6, 2026

(54) C-SCAN DATA MERGING

(71) Applicant: Evident Canada, Inc., Québec (CA)

(72) Inventor: Rémi Leclerc, Quebec City (CA)

(73) Assignee: Evident Canada, Inc., Québec (CA)

( * ) Notice: Subject to any disclaimer, the term of this patent is extended or adjusted under 35 U.S.C. 154(b) by 706 days.

(21) Appl. No.: 18/043,369

(22) PCT Filed: Aug. 30, 2021

(86) PCT No.: PCT/CA2021/051197
§ 371 (c)(1),
(2) Date: Feb. 28, 2023

(87) PCT Pub. No.: WO2022/040812
PCT Pub. Date: Mar. 3, 2022

(65) Prior Publication Data

US 2023/0314376 A1 Oct. 5, 2023

Related U.S. Application Data

(60) Provisional application No. 63/072,437, filed on Aug. 31, 2020.

(51) Int. Cl.
*G01N 27/9093* (2021.01)
*G01N 27/90* (2021.01)
*G01N 27/904* (2021.01)

(52) U.S. Cl.
CPC ....... *G01N 27/9093* (2013.01); *G01N 27/904* (2013.01); *G01N 27/9046* (2013.01)

(58) Field of Classification Search
CPC ........ G01N 27/72; G01N 27/82; G01N 27/90; G01N 27/904; G01N 27/9046;
(Continued)

(56) References Cited

U.S. PATENT DOCUMENTS 5,130,651 A * 7/1992 Morrey, Jr. ........ G01N 27/9053 324/225
6,220,099 B1 4/2001 Marti et al.
(Continued)

FOREIGN PATENT DOCUMENTS

CN 102375027 A 3/2012
CN 202196039 U 4/2012
(Continued)

OTHER PUBLICATIONS

"Canadian Application Serial No. 3, 190,617, Examiners Rule 86(2) Report mailed May 29, 2024", 4 pgs.
(Continued)

*Primary Examiner* — Huy Q Phan
*Assistant Examiner* — David B Frederiksen
(74) *Attorney, Agent, or Firm* — K&L Gates LLP

(57) ABSTRACT

Examples of the present subject matter provide techniques for gathering inspection data (e.g., c-scan) from a plurality of probes, such as ECA probes. Each probe may generate inspection data obtained from different in-plane probe orientations on a surface, such as providing indications from disturbances or flaws located in different in-plane directions relative to a probe sensitivity axis. The inspection data may then be combined while indications at different orientations may be preserved and then merged to generate a composite. Pattern recognition using templates defining flaws or abnormalities may then be performed to determine the type of indication, e.g., detrimental flaw or non-detrimental abnormality.

12 Claims, 6 Drawing Sheets

(58) Field of Classification Search
CPC ........ G01N 27/9093; G01D 5/12; G01D 5/14; G01D 5/16
See application file for complete search history.

(56) References Cited

U.S. PATENT DOCUMENTS

| | | | | |
|---|---|---|---|---|
| 2003/0071615 | A1* | 4/2003 | Schlicker | G01N 27/9006 324/252 |
| 2003/0089171 | A1 | 5/2003 | Kenefick et al. | |
| 2004/0004475 | A1* | 1/2004 | Goldfine | G01N 27/902 324/242 |
| 2005/0088172 | A1 | 4/2005 | Goldfine et al. | |
| 2005/0264284 | A1* | 12/2005 | Wang | G01N 27/902 324/238 |
| 2008/0004817 | A1* | 1/2008 | Nishimizu | G01N 27/9046 702/33 |
| 2008/0246468 | A1* | 10/2008 | Lepage | G01N 27/90 324/225 |
| 2009/0115411 | A1* | 5/2009 | Sun | G01N 27/9006 324/242 |
| 2009/0150093 | A1* | 6/2009 | Junker | G01N 27/9046 702/38 |
| 2010/0207619 | A1* | 8/2010 | Wu | G01N 27/90 324/238 |
| 2012/0007595 | A1* | 1/2012 | Lepage | G01N 27/904 324/239 |
| 2012/0025816 | A1 | 2/2012 | Lepage | |
| 2012/0123699 | A1 | 5/2012 | Kawata et al. | |
| 2019/0369055 | A1* | 12/2019 | Bi | G01N 27/9006 |

FOREIGN PATENT DOCUMENTS

| | | | |
|---|---|---|---|
| CN | 116157676 | A | 5/2023 |
| EP | 4204798 | B1 | 10/2025 |
| WO | WO-2009093070 | A1 | 7/2009 |

OTHER PUBLICATIONS

"Canadian Application Serial No. 3, 190,617, Response filed Sep. 27, 2024 to Examiners Rule 86(2) Report mailed May 29, 2024", 19 pgs.

"European Application Serial No. 21859474.5, Extended European Search Report mailed Aug. 13, 2024", 7 pgs.

"European Application Serial No. 21859474.5, Response filed Oct. 12, 2023 to Communication pursuant to Rules 161(1) and 162 EP", 11 pgs.

Gui, Yun Tian, et al., "Multiple Sensors on Pulsed Eddycurrent Detection For 3-D Subsurface Crack Assessmen", IEEE Sensors Journal, IEEE, USA, vol. 5, No. 1, (Feb. 1, 2005), 90-96.

"International Application Serial No. PCT/CA2021/051197, International Search Report mailed Nov. 26, 2021", 3 pgs.

"International Application Serial No. PCT/CA2021/051197, Written Opinion mailed Nov. 26, 2021", 4 pgs.

"Canadian Application Serial No. 3,190,617, Examiners Rule 86(2) Report mailed Jun. 18, 2025", 4 pgs.

"Canadian Application Serial No. 3,190,617, Response filed Oct. 17, 2025 to Examiners Rule 86(2) Report mailed Jun. 18, 2025", W/ English Claims, 17 pgs.

"Chinese Application Serial No. 202180052113.4, Office Action mailed Jul. 31, 2025", W/ English Translation, 19 pgs.

"Chinese Application Serial No. 202180052113.4, Response filed Dec. 1, 2025 to Office Action mailed Jul. 31, 2025", W/English Claims, 15 pgs.

"European Application Serial No. 21859474.5, Response filed Feb. 25, 2025 to Extended European Search Report mailed Aug. 13, 2024", 10 pgs.

* cited by examiner

C-SCAN DATA MERGING

CROSS-REFERENCE TO RELATED APPLICATIONS

This application is a U.S. National Stage Filing under 35 U.S.C. 371 from International Application No. PCT/CA2021/051197, filed Aug. 30, 2021, which claims the benefit of priority to U.S. Provisional Patent Application Ser. No. 63/072,437, filed Aug. 31, 2020, the contents of which are incorporated herein by reference in their entireties.

TECHNICAL FIELD

The present disclosure generally relates to non-destructive surface inspection.

BACKGROUND

Non-destructive inspection techniques can be used to inspect components, such as, but not limited to, a pressure vessel, an aircraft wing, an aircraft fuselage, a rail for railroad use, a railcar wheel, or other types of components. For some conductive materials, eddy current array (ECA) probes can be used for inspection. In an ECA probe, alternating current is injected into one or more coils inside the ECA probe, generating a magnetic field. When the ECA probe is placed over an object-under-test, opposed alternating currents (referred to as eddy currents) are generated. Abnormalities in the object-under-test can disturb the path of the eddy currents, and this disturbance can then be detected and measured by the probe.

Using an ECA probe, a technician can scan the object-under-test and receive an indication that the ECA probe has encountered a disturbance. However, not all disturbances correspond to harmful defects. Some disturbances can be caused by non-harmful abnormalities. For example, a scab, which is the result of excess materials building on a surface during a rolling process leaving a circular-type mark on the surface, can often trigger a disturbance. But a scab may not be considered an unacceptable defect. Thus, in response to receiving a defect indication, the technician may go back and verify the cause of the notification by re-scanning the area at different angles and then further considering whether the cause of the defect indication is an unacceptable defect or not. This can lead to a protracted and sometimes error-prone inspection process.

BRIEF DESCRIPTION OF THE DRAWINGS

Various ones of the appended drawings merely illustrate example implementations of the present disclosure and should not be considered as limiting its scope.

DETAILED DESCRIPTION

Figure 1:
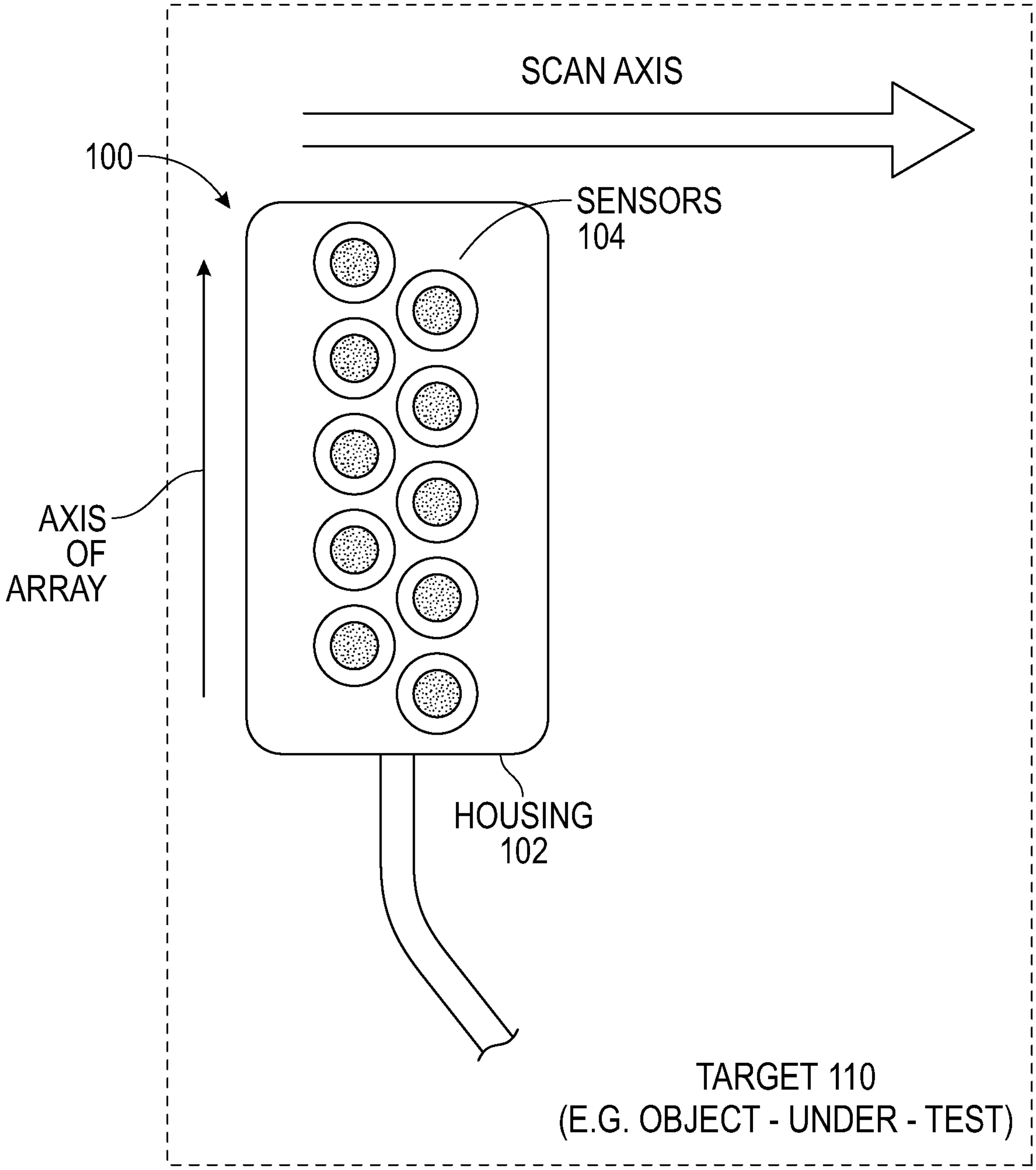
FIG. 1 illustrates an ECA probe.

The inventor has recognized, among other things, a need in the art for an inspection system that overcomes the challenges discussed above. Examples of the present subject matter provide techniques for gathering inspection data (e.g., c-scan) from a plurality of probes, such as ECA probes. Each probe may generate inspection data obtained from different in-plane probe orientations on a surface, such as providing indications from disturbances or flaws located in different in-plane directions relative to a probe sensitivity axis. The inspection data may then be combined while indications at different orientations may be preserved and then merged to generate a composite. Pattern recognition using templates defining flaws or abnormalities may then be performed to determine the type of indication, e.g., detrimental flaw or non-detrimental abnormality. Thus, the systems and methods described herein provide fast inspection techniques while reducing errors.

This document describes a method comprising: receiving a first set of eddy-current inspection data providing disturbance indication data obtained in a first orientation relative to a first sensitivity axis; receiving a second set of eddy-current inspection data providing disturbance indication information in a second orientation relative to a second sensitivity axis, the second orientation being different from the first orientation; combining the first and second sets of inspection data to generate a combined data set preserving the disturbance indication data in the first and second orientations; and based on the combined data set, generating a composite of an abnormality.

This document also describes an inspection system. The inspection system may include a first probe configured to obtain a first set of eddy-current inspection data from an object, providing indication information in a first orientation relative to a first sensitivity axis. The inspection system may also include a second probe configured to obtain a second set of eddy-current inspection data from the object, providing indication information in a second orientation relative to a second sensitivity axis. The inspection system may further include a processor configured to combine to the first and second sets of eddy-current inspection data to generate a combined data set preserving the indication information in the first and second orientations and to merge indication information in the combined data set to generate a composite of an abnormality.

This document further describes a machine readable medium embodying instructions that, when executed by a machine, cause the machine to perform operations comprising: receiving a first set of eddy-current inspection data providing disturbance indication data obtained in a first orientation relative to a first sensitivity axis; receiving a second set of eddy-current inspection data providing disturbance indication information in a second orientation relative to a second sensitivity axis, the second orientation being different from the first orientation; combining the first and second sets of inspection data to generate a combined data set preserving the disturbance indication data in the first and second orientations; and based on the combined data set, generating a composite of an abnormality.

FIG. 1 illustrates an example of an ECA probe assembly 100 from a top view looking downward onto a surface of an object. The ECA probe assembly 100 may include a housing 102 and a plurality of sensors 104 disposed inside the housing 102. The ECA probe assembly 100 may be placed on or near a target 110 (e.g., object-under-test). The sensors 104 may include one or more coils and may be arranged in one or more rows inside the housing 102. The sensors 104 may be arranged in a pattern to avoid mutual inductance between the individual sensors. In the example of FIG. 1, the sensors 104 may be arranged in two adjacent rows parallel to an axis of array. The sensors in the first row may be offset or staggered so that the centers of the coils in the first row may be positioned in the spaces between the sensors in a second row to achieve optimized coverage of a scan path along the scan axis and to provide high resolution. The scan axis is defined by the movement of the sensors 104 along the target 110 during inspection. The sensors 104 may also be arranged in more than two rows.

In another example, the sensors 104 may be stacked on top of each other on respective printed circuit board (PCB) layers. In this example, the stacked sensors may be provided in one row. The PCB layers may be flexible or rigid.

During inspection, the ECA probe assembly 100 may be moved along the scan axis. While the ECA probe assembly 100 moves along the scan axis, the ECA probe assembly 100 may perform inspection of a surface, including a small area beneath the surface of the target 110. For example, it may inspect a few mm below the surface, depending on the material properties and the frequency and size of the sensors (e.g., for carbon steel around a few micrometers; for aluminum, approximately 5 mm). An alternating current may be injected into the coils to create magnetic field and opposing alternating current (eddy currents) are generated on the surface of the target 110. Higher frequencies (e.g., 50 kHz to 500 kHz) may be used to provide a higher resolution to detect smaller abnormalities; higher frequencies may result in comparatively less penetration into an area directly beneath the surface. Abnormalities in the part may disturb the path of the eddy currents, which may then be measured by the ECA probe assembly 100.

In an example, data from the probe assembly 100 may be multiplexed. Individual ones of the coils 104 may be excited at different times so as to not excite two adjacent coils at the same time. This may minimize mutual inductance, which is associated with magnetic coupling between coils.

Figure 2:
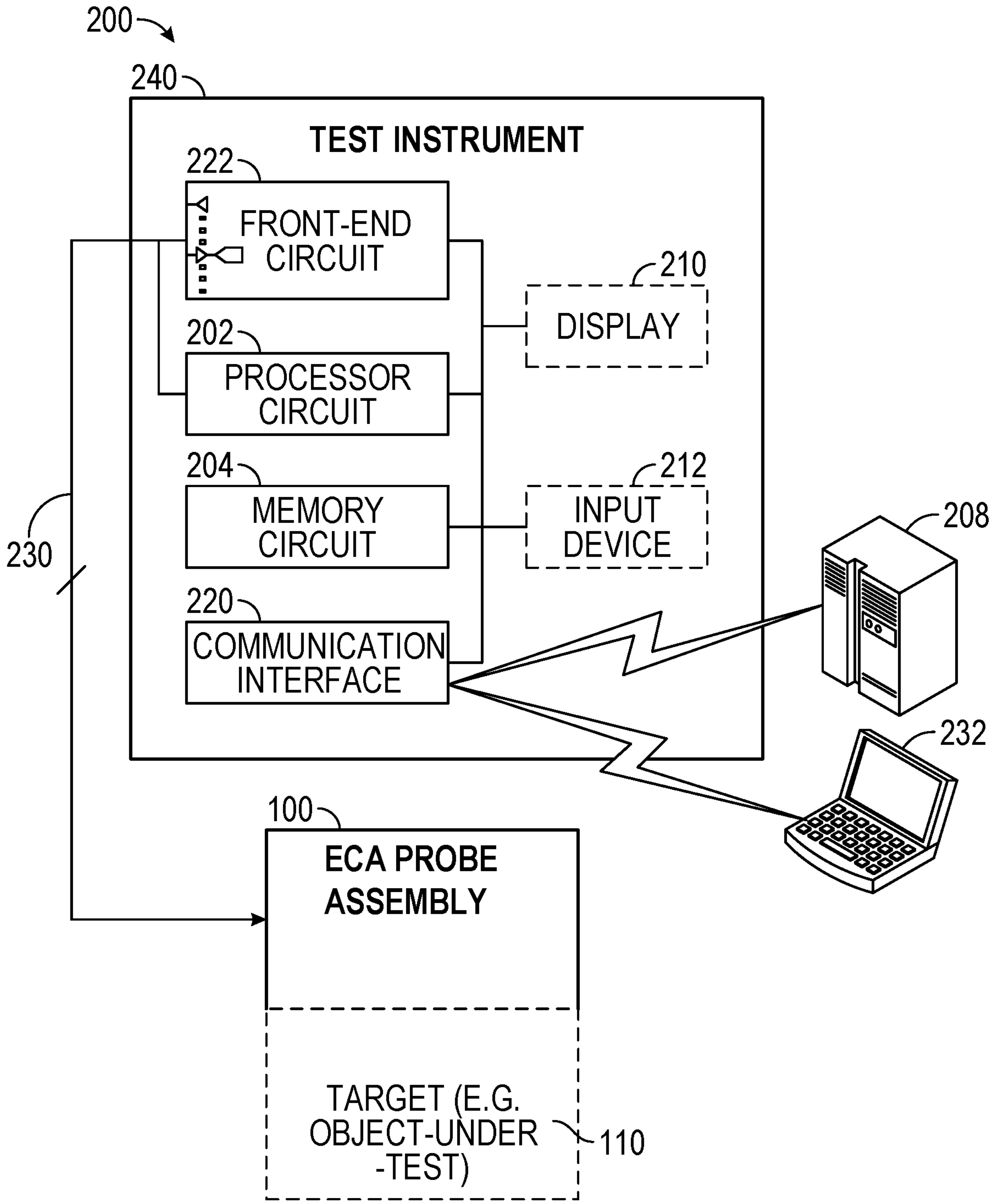
FIG. 2 illustrates an inspection system, according to an example of the present subject matter.

FIG. 2 illustrates generally an example comprising an inspection system 200, such as can be used to perform one or more techniques showed and described elsewhere herein. The inspection system 200 may include a test instrument 240, such as a hand-held or portable assembly. The test instrument 240 may be electrically coupled to a probe assembly 100, such as using a multi-conductor interconnect 230. The ECA probe assembly 100 may be provided as described above with reference to FIG. 1.

The test instrument 240 can include digital and analog circuitry, such as a front-end circuit 222 including one or more transmit and receive signal chains. The transmit signal chain can include amplifier and filter circuitry, such as to provide altermatic currents for delivery through an interconnect 230 to the ECA probe assembly 100 for inspection.

While FIG. 2 shows a single ECA probe assembly 100, other configurations may be used, such as multiple probe assemblies connected to a single test instrument 240 for tandem inspection, such as the inspection processes described below with reference to FIGS. 3-5. Moreover, an inspection protocol may be performed using coordination between multiple test instruments 240, such as in response to an overall test scheme established from a master test instrument 240, or established by another remote system such as a compute facility 208 or general purpose computing device such as a laptop 232, tablet, smart-phone, desktop computer, or the like. The test scheme may be established according to a published standard or regulatory requirement and may be performed upon initial fabrication or on a recurring basis for ongoing surveillance, as illustrative examples.

The front-end circuit 222 can be coupled to and controlled by one or more processor circuits, such as a processor circuit 202 included as a portion of the test instrument 240. The processor circuit can be coupled to a memory circuit, such as to execute instructions that cause the test instrument 240 to perform one or more of coil excitation, signal acquisition, processing, or storage of data relating to inspection, or to otherwise perform techniques as shown and described herein. The test instrument 240 can be communicatively coupled to other portions of the system 200, such as using a wired or wireless communication interface 220.

For example, performance of one or more techniques as shown and described herein can be accomplished on-board the test instrument 240 or using other processing or storage facilities such as using a compute facility 208 or a general-purpose computing device such as a laptop 232, tablet, smart-phone, desktop computer, or the like. For example, processing tasks that would be undesirably slow if performed on-board the test instrument 240 or beyond the capabilities of the test instrument 240 can be performed remotely (e.g., on a separate system), such as in response to a request from the test instrument 240. Similarly, storage of inspection data or intermediate data such as c-scan matrices can be accomplished using remote facilities communicatively coupled to the test instrument 240. The test instrument can include a display 220, such as for presentation of configuration information or results, and an input device 222 such as including one or more of a keyboard, trackball, function keys or soft keys, mouse-interface, touch-screen, stylus, voice, gestures, or the like, for receiving operator commands, configuration information, or responses to queries.

Figure 3:
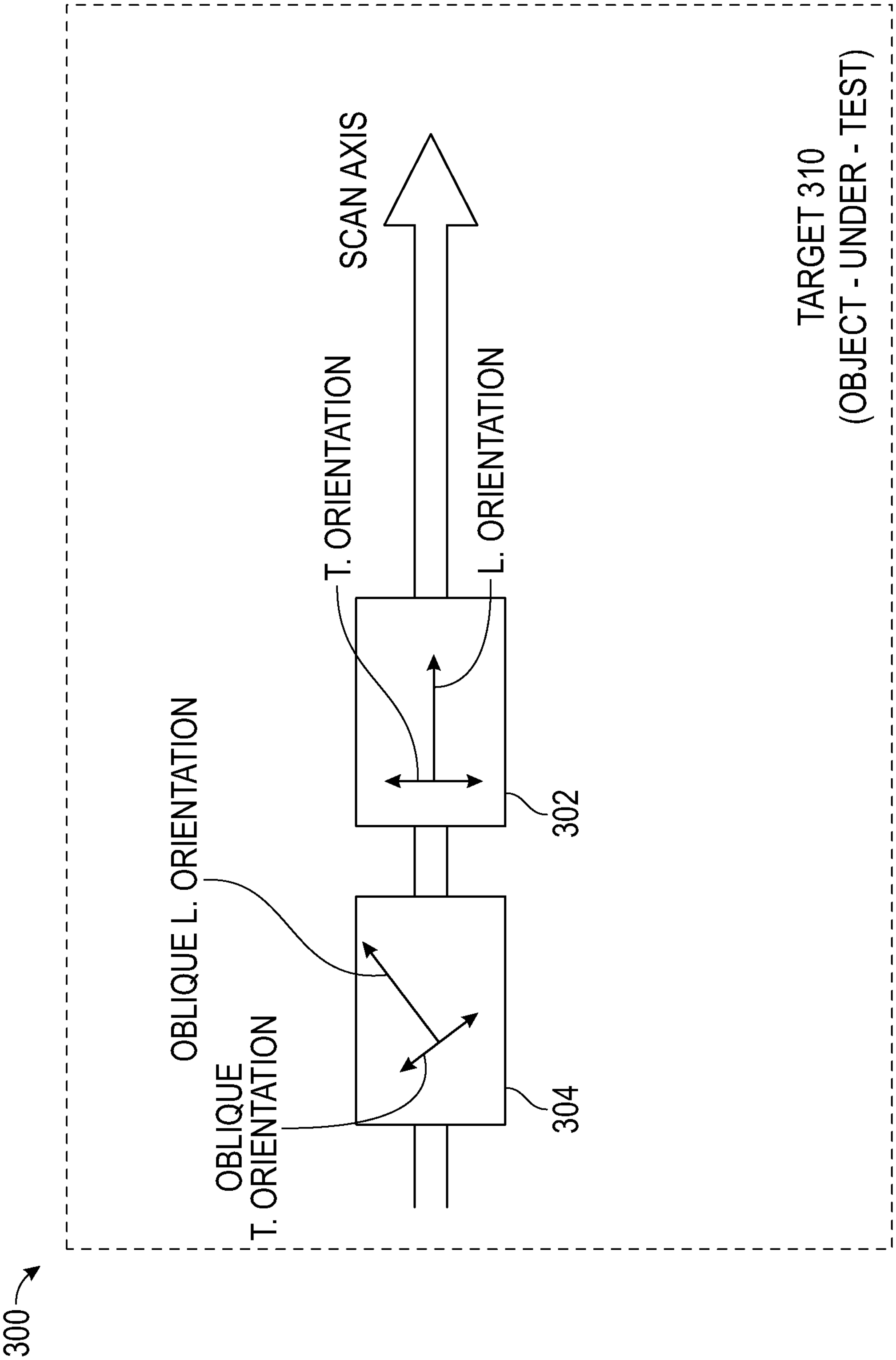
FIG. 3 illustrates an inspection arrangement, according to an example of the present subject matter.

FIG. 3 illustrates an inspection arrangement 300, according to an example of the present subject matter. FIG. 3 is a top view looking downward onto a surface of an object. The inspection arrangement 300 may include a first probe 302, a second probe 304, and a target 310 (e.g., object-under-test). The first and second probes 302, 304 may be provided as ECA probes as described above (e.g., ECA probe assembly 100). The first and second probes 302 may be positioned on or near a surface of the target 310. The target 310, for example, may be a rail, a pipe, or another component to be inspected. A probe sensitivity axis of first probe 302 may be positioned in a first position. For example, it may be positioned at a normal position to the scan axis, e.g., the axis of the array is perpendicular to the scan axis.

The first and second probes 302, 304 may be provided as directional sensors; thus, they may detect abnormalities in predefined orientations based on their respective sensitivity axes. The first probe 302 may be configured to detect attributes or abnormalities (e.g., disturbances in the eddy currents) in two directions: a longitudinal orientation (L. Orientation) and transverse orientation (T. Orientation) relative to the scan axis. That is, the longitudinal orientation may be parallel to the scan axis, and the transverse orientation may be perpendicular to the scan axis; hence the longitudinal and transverse orientations may be orthogonal to each other.

The second probe 304 may be located on or near the surface of the target 310. For example, the second probe 304 may be positioned adjacent the first probe 302 relative to the scan axis. The probe sensitivity axis of second probe 304 may be arranged in a second position, which may be different than the first position of the first probe 302. For example, the probe sensitivity axis of the second probe 304 may be positioned at an oblique angle (e.g., not normal) relative to the scan axis. For example, the probe sensitivity axis of the second probe 304 may be positioned at approximately 45° angle relative to the scan axis. The second probe 302 may be configured to detect attributes or abnormalities (e.g., disturbances in the eddy currents) in two orientations: an oblique longitudinal orientation and an oblique transverse orientation relative to the scan axis.

As described above, the first and second probes 302, 304 may be coupled to one or more test instruments to perform tandem inspection. Moreover, FIG. 3 illustrates two probes for illustration purposes and more than two probes may be provided to perform tandem inspection; each probe's sensitivity axis may be positioned at different angles relative to the scan axis to detect attributes or abnormalities in different orientations.

Figure 4:
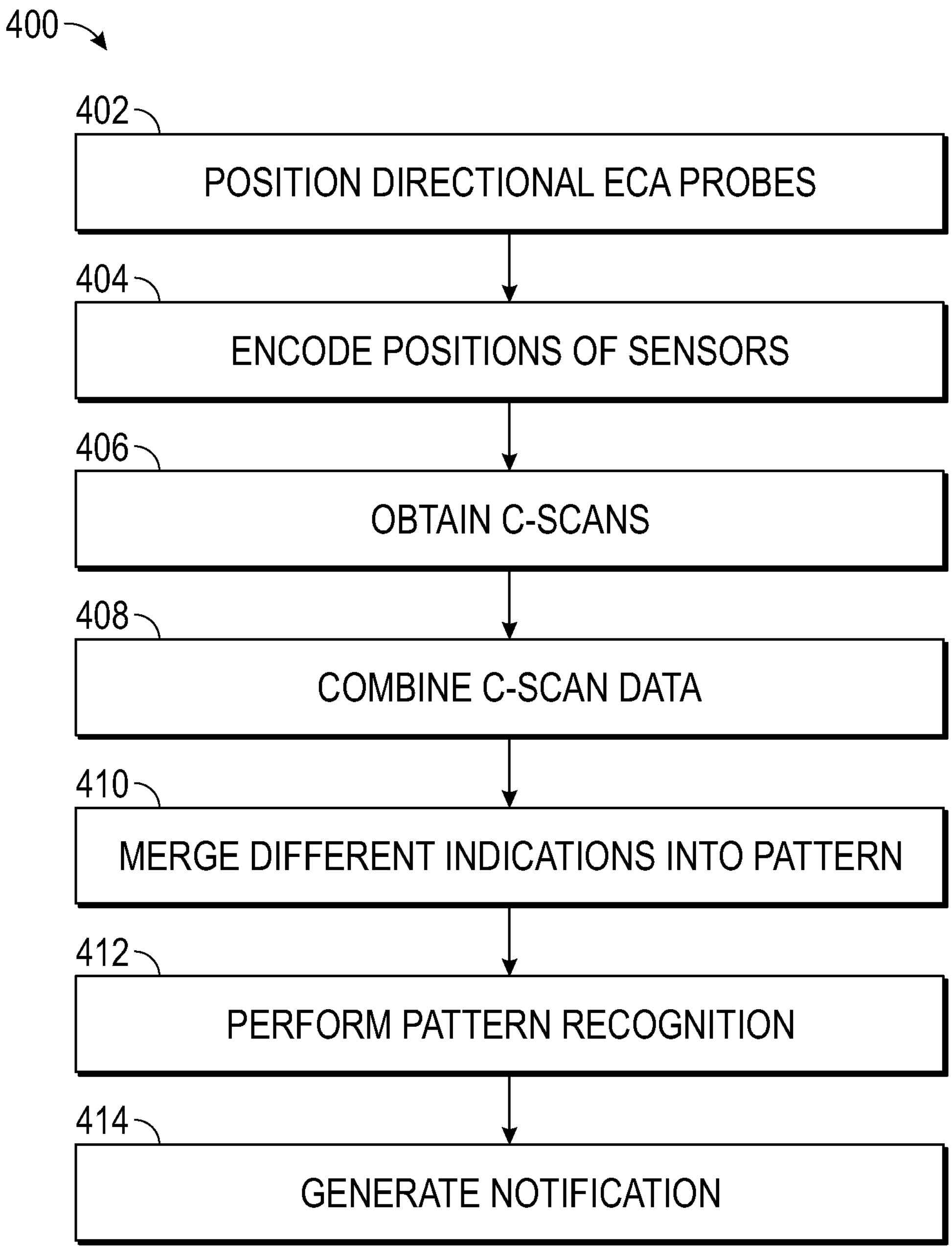
FIG. 4 is a flow diagram for an inspection process, according to an example of the present subject matter.

FIG. 4 is a flow diagram of an inspection process 400, according to an example of the subject matter. The inspection process 400 may be performed using the inspection components described above (e.g., inspection arrangement 300). At 402, two or more directional ECA probes may be positioned on or near the surface of an object-under-test. The two or more ECA probes may be positioned at different sensitivity angles relative to the scan axis. As discussed above, each ECA probe may detect abnormalities in two orientations (e.g., a longitudinal and transverse orientation relative to the probe's sensitivity axis).

At 404, position of the sensors (e.g., coils) within the ECA probes may be determined and encoded into the system. For example, if the sensors are arranged in a plurality of rows, position of the sensors relative to each other may be determined and encoded. That is because the sensors in different rows may detect the same abnormality (e.g., a transverse-type abnormality) at different times. Sensors in the front row may detect the abnormality before the sensors in the back row. The encoded position information of the sensors may be used to re-align the sensor data.

At 406, inspection data, such as c-scan data, from the ECA probes may be received. The c-scan data from the probes may be normalized data based on reference data for the object-under-test. The reference data may have been obtained from a prior calibration process, a manufacturing specification, or other suitable source. The c-scan data for each ECA probe may include detected abnormalities (e.g., indications) in two orientations, as described above. The c-scan data may be provided as a two-dimensional surface map. The c-scan data may be captured while the target is moving, for example along a conveyer belt.

At 408, the c-scan data from the ECA probes may be combined. If one or more sets of c-scan data include indications, the c-scan data may be combined in a manner to preserve the indications, including the orientations of the indications. For example, based on the indications, the sensitivity axis of each of the probes (e.g., two probes) may be determined. Thus, an indication at a specific location may be classified as belong to an orientation along one of the four axes (e.g., longitudinal, transverse, oblique longitudinal, oblique transverse) by checking which probe shows a maximum absolute value, which will narrow it to two axis (e.g., either longitudinal or transverse, or oblique longitudinal or transverse), and by checking the sign of value, which will narrow it to one axis. When using more than two probes, the spatial positioning of the sensors may be determined and encoded to compare the indication for determining the appropriate location. The combination of c-scan data may include the accumulation (e.g., location summation) of the indications in each orientation detected by the ECA probes.

At 410, the different indications in the combined c-scan data may be merged together to generate a pattern. For example, the indications may be merged to form a continuous or semi-continuous line (e.g., for disjointed attributes). The merging may be performed based on a proximity threshold of different indications. For example, if one indication is located within a proximity threshold of another indication, the two indications may be merged together using interpolation or similar techniques to form the pattern.

At 412, pattern recognition may be performed on the generated pattern. Different patterns associated with different abnormalities (e.g., scabs, welding defect) may be stored in a memory. The generated pattern may be compared to the stored patterns to determine whether the generated pattern matches one of the stored patterns.

At 414, based on matching the generated pattern to a stored pattern, a notification may be generated. The notification may include an audible alarm. The notification may include a display to the user (e.g., technician), alerting the technician of the detected pattern and the matched abnormality. For example, the technician may be shown the generated pattern and be notified that the generated pattern matches the pattern of the matched abnormality (e.g., a scab). In another example, this step may be automated, and the notification may be internal to the system.

Figure 5:
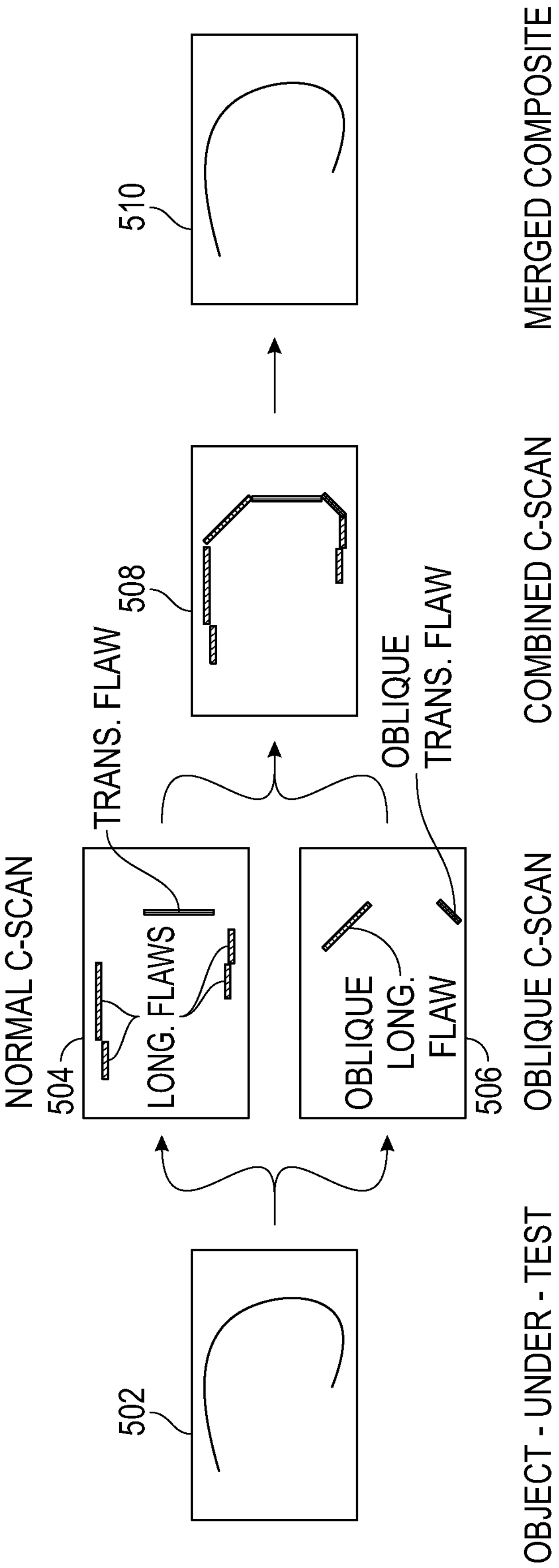
FIG. 5 illustrates pictorial representation of an inspection process, according to an example of the present subject matter.

FIG. 5 illustrates a pictorial representation of an inspection process, according to an example of the subject matter. Picture 502 shows an abnormality on a surface of an object-under-test. As shown, the abnormality may be a hook shape. Next, different sets of inspection data (e.g., c-scans) may be obtained. Picture 504 shows a normal c-scan obtained from an ECA probe whose sensitivity axis is positioned normal to the scan axis. Picture 504 shows indications in transverse and longitudinal orientations relative to the scan axis.

Picture 506 shows an oblique c-scan obtained from an ECA probe whose sensitivity axis is positioned at an oblique angle to the scan axis. Picture 506 shows indications in two orientations: oblique transverse and oblique longitudinal orientations relative to the scan axis. Moreover, more than two scans may be obtained, each scan at a different angle relative to the scan axis. The c-scans may be obtained using separate probes or they may be obtained using the same probe that sequentially scans the surface at the specified angles.

Picture 508 shows a combined c-scan, which combines the indications in the individual c-scans in pictures 504, 506. As shown, picture 508 combines the indications in transverse and longitudinal orientations from picture 504 and indications in oblique transverse and oblique longitudinal orientations from picture 506.

Picture 510 shows a merged composite based on the combined c-scan, which may be generated by merging the different indications in the combined c-scan. The different indications may be merged into a continuous or semi-continuous line in a piece-wise manner or according to a spline technique or other analytical (e.g., parametric) model.

The merged composite may be stored and displayed to the technician. The merged composite may also be compared to stored patterns (e.g., pattern templates) corresponding to different abnormality types. If a match is found, the technician may be notified of the match and the corresponding abnormality of the matched pattern. For example, merged composite of picture 510 may be matched to a stored pattern for a scab; therefore, the technician may be notified that a scab was detected.

Figure 6:
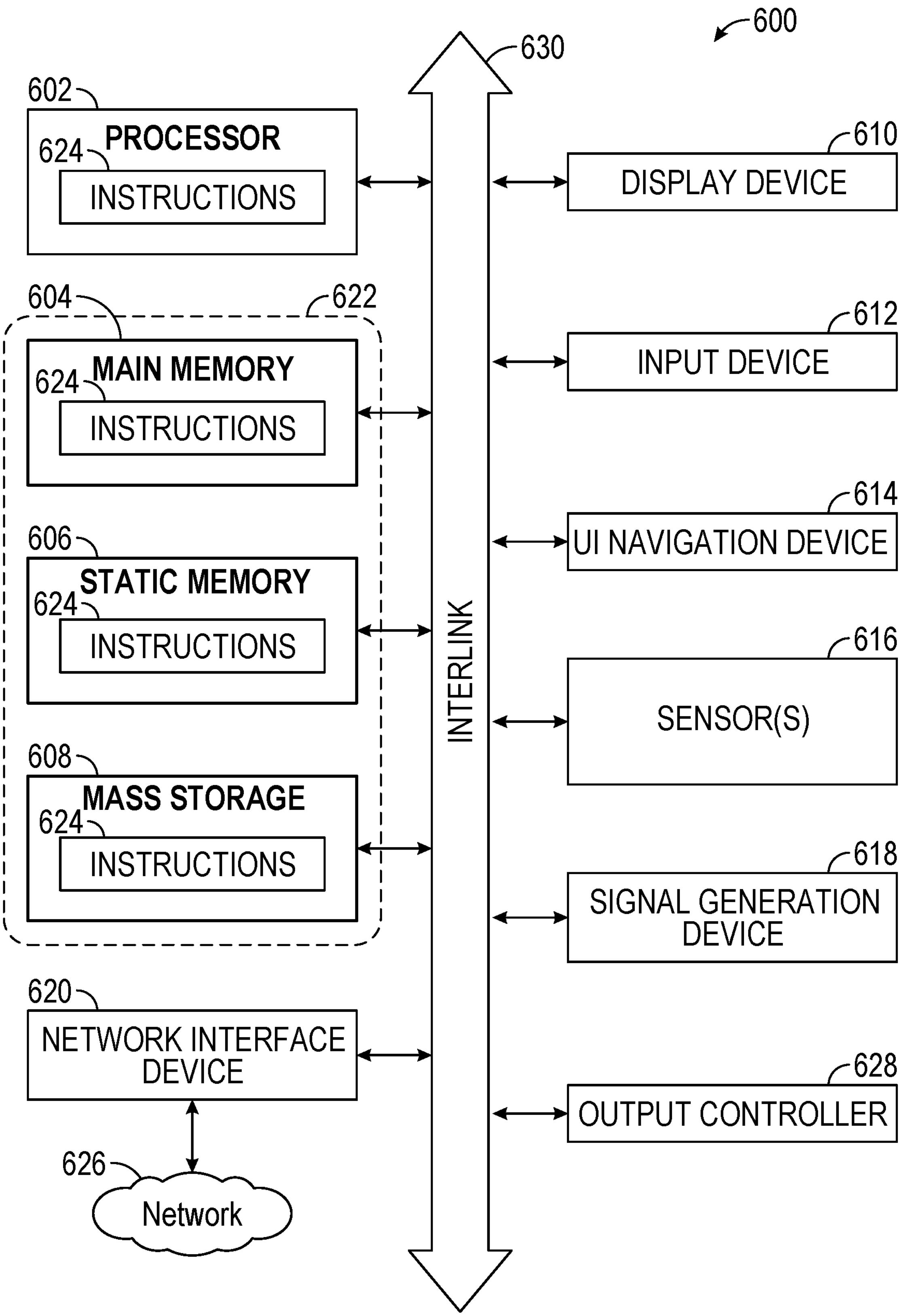
FIG. 6 illustrates a block diagram of an example comprising a machine upon which any one or more of the techniques (e.g., methodologies) discussed herein may be performed.

The techniques shown and described in this document can be performed using a portion or an entirety of an inspection system 200 as shown in FIG. 2 or otherwise using a machine 600 as discussed below in relation to FIG. 6. FIG. 6 illustrates a block diagram of an example comprising a machine 600 upon which any one or more of the techniques (e.g., methodologies) discussed herein may be performed. In various examples, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 622 may include a machine readable medium 608 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 626 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.22 family of standards known as Wi-Fi®, IEEE 802.26 family of standards known as WiMax®), IEEE 802.25.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

What is claimed is:

1. A method comprising:

scanning, by a first eddy-current array probe, an object along a scan axis to generate a first set of c-scan inspection data representing first eddy-current responses, the first eddy-current array probe comprising a first probe sensitivity axis at a first orientation relative to the scan axis, the first set of c-scan inspection data comprising first disturbance indication data corresponding to deviations in the first eddy-current responses at an associated spatial location;

scanning, by a second eddy-current array probe, the object along the scan axis to generate a second set of c-scan inspection data representing second eddy-current responses, the second eddy-current array probe comprising a second probe sensitivity axis at a second orientation relative to the scan axis, the second set of c-scan inspection data comprising second disturbance indication data corresponding to deviations in the second eddy-current responses at an associated spatial location, the second orientation being different from the first orientation;

combining the first and second sets of c-scan inspection data and classifying an orientation of each of the first and second disturbance indication data to generate a combined c-scan data set;

based on the spatial locations associated with the classified first and second disturbance indication data satisfying a proximity threshold, merging the first and second disturbance indication data of the combined c-scan data to generate a composite image representing an object abnormality.

2. The method of claim 1, wherein the wherein the first eddy-current array probe is a first directional probe and the second eddy-current array probe is a second directional probe.

3. The method of claim 2, further comprising:

encoding position information of sensors in the first eddy-current array probe and the second eddy-current array probe.

4. The method of claim 1, wherein the first disturbance indication data is obtained along a first longitudinal direction parallel to the first probe sensitivity axis, wherein the second disturbance indication data is obtained along a second longitudinal direction parallel to the second probe sensitivity axis, wherein the first set of c-scan inspection data further provides third disturbance indication data obtained along a first transverse direction perpendicular to the first probe sensitivity axis, wherein the second set of c-scan inspection data provides forth disturbance indication data obtained along a second transverse direction perpendicular to the second probe sensitivity axis, wherein the first longitudinal direction and the first transverse direction are orthogonal to each other and the second longitudinal direction and the second transverse direction are orthogonal to each other.

5. An inspection system comprising:

a first eddy-current array probe configured to obtain a first set of c-scan inspection data from an object by scanning along a scan axis, the first set of c-scan inspection data representing first eddy-current responses, the first eddy-current array probe comprising a first probe sensitivity axis configured to be at a first orientation relative to the scan axis, the first set of c-scan inspection data comprising first disturbance indication data corresponding to deviations in the first eddy-current responses at an associated spatial location;

a second eddy-current array probe configured to obtain a second set of c-scan inspection data from the object by scanning along the scan axis, the second eddy-current array probe comprising a second probe sensitivity axis at a second orientation relative to the scan axis, the second set of c-scan inspection data comprising second disturbance indication data corresponding to deviations in the second eddy-current responses at an associated spatial location, the second orientation being different from the first orientation; and a processor configured to:

combine the first and second sets of c-scan inspection data and classify an orientation of each of the first and second disturbance indication data to generate a combined data c-scan; and based on the spatial locations associated with the classified first and second disturbance indication data, merge the first and second disturbance indication data of the combined c-scan data to generate a composite image representing an object abnormality.

6. The inspection system of claim 5, wherein the first and second eddy-current array probes are directional probes.

7. The inspection system of claim 5, wherein the processor is further configured to encode position information of sensors in the first and second eddy-current array probe probes.

8. The inspection system of claim 5, wherein the first eddy-current array probe is configured to obtain the first disturbance indication data along a first longitudinal direction parallel to the first probe sensitivity axis, wherein the second eddy-current array probe is configured to obtain second disturbance indication data along a second longitudinal direction parallel to the second probe sensitivity axis, wherein the first eddy-current array probe is further configured such that the first set of c-scan inspection data further provides third disturbance indication information data obtained along a first transverse direction perpendicular to the first probe sensitivity axis, wherein the second eddy-current array probe is further configured such that the second set of c-scan inspection data provides forth disturbance indication data obtained along a second transverse direction perpendicular to the second probe sensitivity axis, wherein the first longitudinal direction and the first transverse direction are orthogonal to each other and the second longitudinal direction and the second transverse direction are orthogonal to each other.

9. A non-transitory machine readable medium embodying instructions that, when executed by a machine, cause the machine to perform operations comprising:

receiving, from a first eddy-current array probe, a first set of c-scan inspection data representing first eddy-current responses, wherein the first set of c-scan inspection data is generated by the first eddy-current array probe by scanning an object along a scan axis, the first eddy-current array probe comprising a first probe sensitivity axis at a first orientation relative to the scan axis, the first set of c-scan inspection data comprising first disturbance indication data corresponding to deviations in the first eddy-current responses at an associated spatial location;

receiving, from a second eddy-current array probe, a second set of c-scan inspection data representing second eddy-current responses, wherein the second set of c-scan inspection data is generated by the second eddy-current array probe by scanning the object along the scan axis, the second eddy-current array probe comprising a second probe sensitivity axis at a second orientation relative to the scan axis, the second set of c-scan inspection data comprising second disturbance indication data corresponding to deviations in the second eddy-current responses at an associated spatial location, the second orientation being different from the first orientation;

combining the first and second sets of c-scan inspection data and classifying an orientation of each of the first and second disturbance indication data to generate a combined c-scan data set;

based on the spatial locations associated with the classified first and second disturbance indication data satisfying a proximity threshold, merging the first and second disturbance indication data of the combined c-scan data to generate a composite image representing an object abnormality.

10. The non-transitory machine readable medium of claim 9, wherein the wherein the first eddy-current array probe is a first directional probe and the second eddy-current array probe is a second directional probe.

11. The non-transitory machine readable medium of claim 10, the operations further comprising:

encoding position information of sensors in the first eddy-current array probe and the second eddy-current array probe.

12. The non-transitory machine readable medium of claim 9, wherein the first disturbance indication data is obtained along a first longitudinal direction parallel to the first probe sensitivity axis, wherein the second disturbance indication data is obtained along a second longitudinal direction parallel to the second probe sensitivity axis, wherein the first set of c-scan inspection data further provides third disturbance indication data obtained along a first transverse direction perpendicular to the first probe sensitivity axis, wherein the second set of c-scan inspection data provides forth disturbance indication data obtained in along a second transverse direction perpendicular to the second probe sensitivity axis, wherein the first longitudinal direction and and the first transverse direction are orthogonal to each other and the second longitudinal direction and the second transverse direction are orthogonal to each other.

* * * * *